(12) United States Patent
Tits et al.

(10) Patent No.: US 6,504,504 B1
(45) Date of Patent: Jan. 7, 2003

(54) ANTENNA SYSTEM FOR RECEIVING SIGNALS THAT ARE TRANSMITTED BY GEOSTATIONARY SATELLITE

(75) Inventors: Daniel G. Tits, Droue sur Drouette (FR); Kamal Lotfy, Paris (FR)

(73) Assignee: Eutelsat S.A., Paris (FR)

( * ) Notice: Subject to any disclaimer, the term of this patent is extended or adjusted under 35 U.S.C. 154(b) by 0 days.

(21) Appl. No.: 09/584,102

(22) Filed: May 31, 2000

(30) Foreign Application Priority Data

Jun. 2, 1999 (FR) ............................ 99 06961

(51) Int. Cl.[7] ................................ G01S 3/02
(52) U.S. Cl. ................ 342/359; 342/356; 342/362
(58) Field of Search ................ 342/361, 362, 342/363, 364, 365, 366, 359, 356

(56) References Cited

U.S. PATENT DOCUMENTS 5,347,286 A * 9/1994 Babitch .................. 342/359
5,701,591 A * 12/1997 Wong .................... 342/366
5,929,808 A * 7/1999 Hassan et al. ............ 342/368

FOREIGN PATENT DOCUMENTS

GB 2 173 643 10/1986

OTHER PUBLICATIONS

Skolnik. "Radar Handbook", *McGraw–Hill*, pp. 22–25, (1970).

* cited by examiner

*Primary Examiner*—Theodore M. Blum
(74) *Attorney, Agent, or Firm*—Browdy and Neimark, P.L.L.C.

(57) ABSTRACT

The antenna system comprises a reflector which can be motionless, a source device and a device for treating the signals received by the source device. The system comprises means for automatically tracking the satellite that deviates from its initial position to an inclined orbital path.

7 Claims, 2 Drawing Sheets

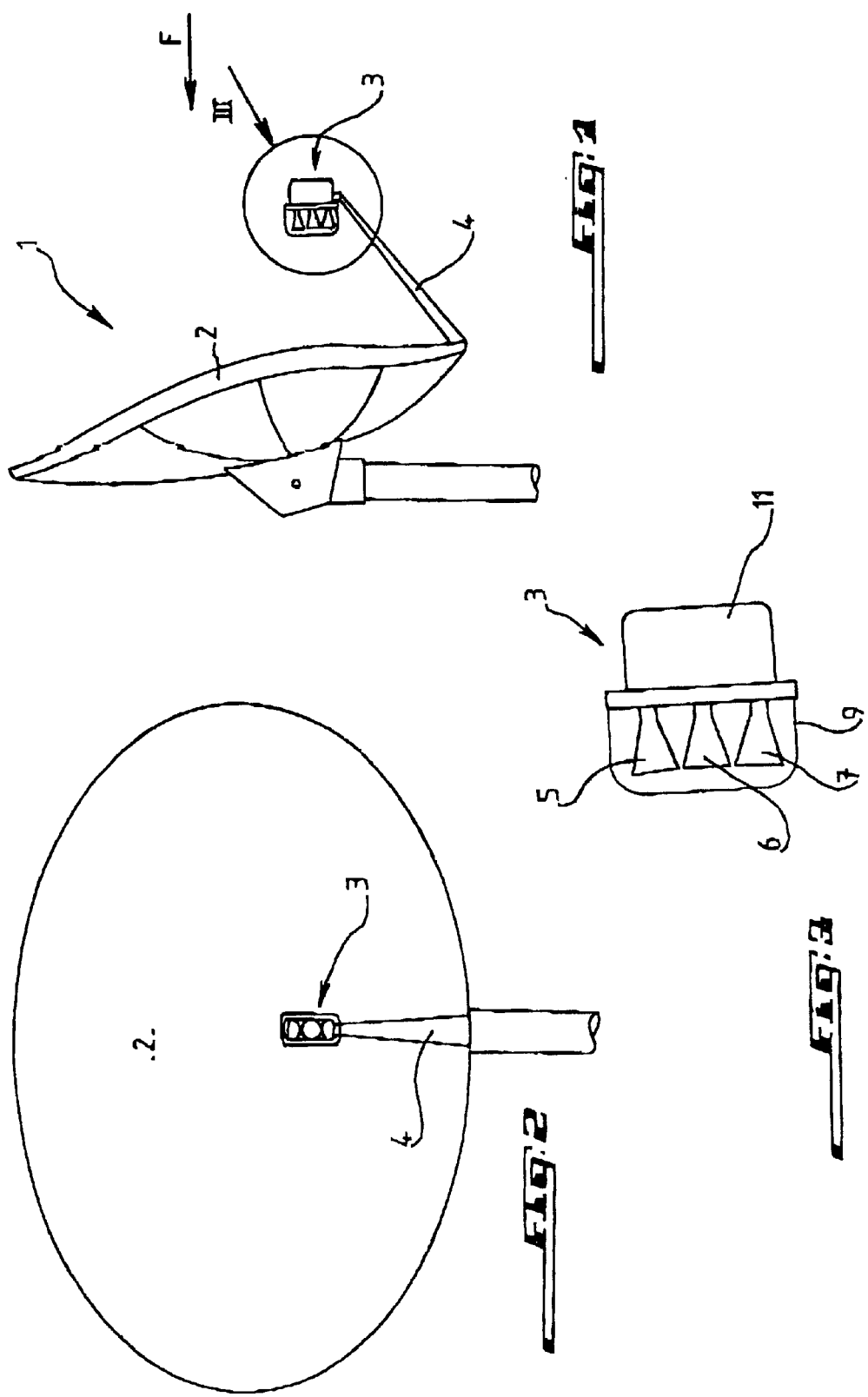

ANTENNA SYSTEM FOR RECEIVING SIGNALS THAT ARE TRANSMITTED BY GEOSTATIONARY SATELLITE

FIELD OF THE INVENTION

This invention relates to an antenna system for receiving signals that are transmitted by a geostationary satellite, of a type comprising a reflector, a source device and a device for treating the signals received by the source device.

In order that geostationary satellites are able to remain as long as possible in their initial position, they are equipped with embarked means that are adapted for correcting their deviations from this position, the antenna being a fixed antenna. Yet, after a certain working time, power of these embarked means becomes too small for avoiding satellite deviations and a movement of the satellite in an inclined orbital path. Consequently, the quality of the signals received by the antenna is progressively reduced and, finally, the satellite becomes unusable.

PURPOSE AND SUMMARY OF THE INVENTION

The purpose of the present invention is to provide an antenna system which will be able to considerably extend the duration time during which the antenna can correctly receive the signals that are transmitted by the satellite.

For reaching this purpose, the antenna system according to the invention comprises means for automatically tracking the satellite that deviates from its initial position to an inclined orbital path.

According to a feature of the invention, these tracking means comprise a plurality of individual sources arranged at a predetermined distance the one from the other in a vertical plane that contains the antenna focal point, in order to create a multiplicity of overlapping main beams.

According to another feature of the invention, the number of individual sources and the distance therebetween are dependent on the aperture height of the antenna and on the extent of desired vertical tracking.

According to another feature of the invention, among the plurality of individual sources, it is the source that produces the greatest output signal which is connected to the device for treating the signals transmitted by the satellite.

According to another feature of the invention, the source device comprises means for detecting the source that produces the greatest output signal.

Having briefly described the essential features of the present invention, the following drawings together with the more detailed description will serve to explain the concepts and principles of the invention.

BRIEF DESCRIPTION OF THE DRAWINGS

FIG. 1 is a side view of an antenna system according to the present invention;

FIG. 2 is a view taken along arrow F of FIG. 1;

FIG. 3 is an enlarged view of the part of FIG. 1 that is encircled in this figure and shown at III.

DESCRIPTION OF THE PREFERRED EMBODIMENT

Figure 4:
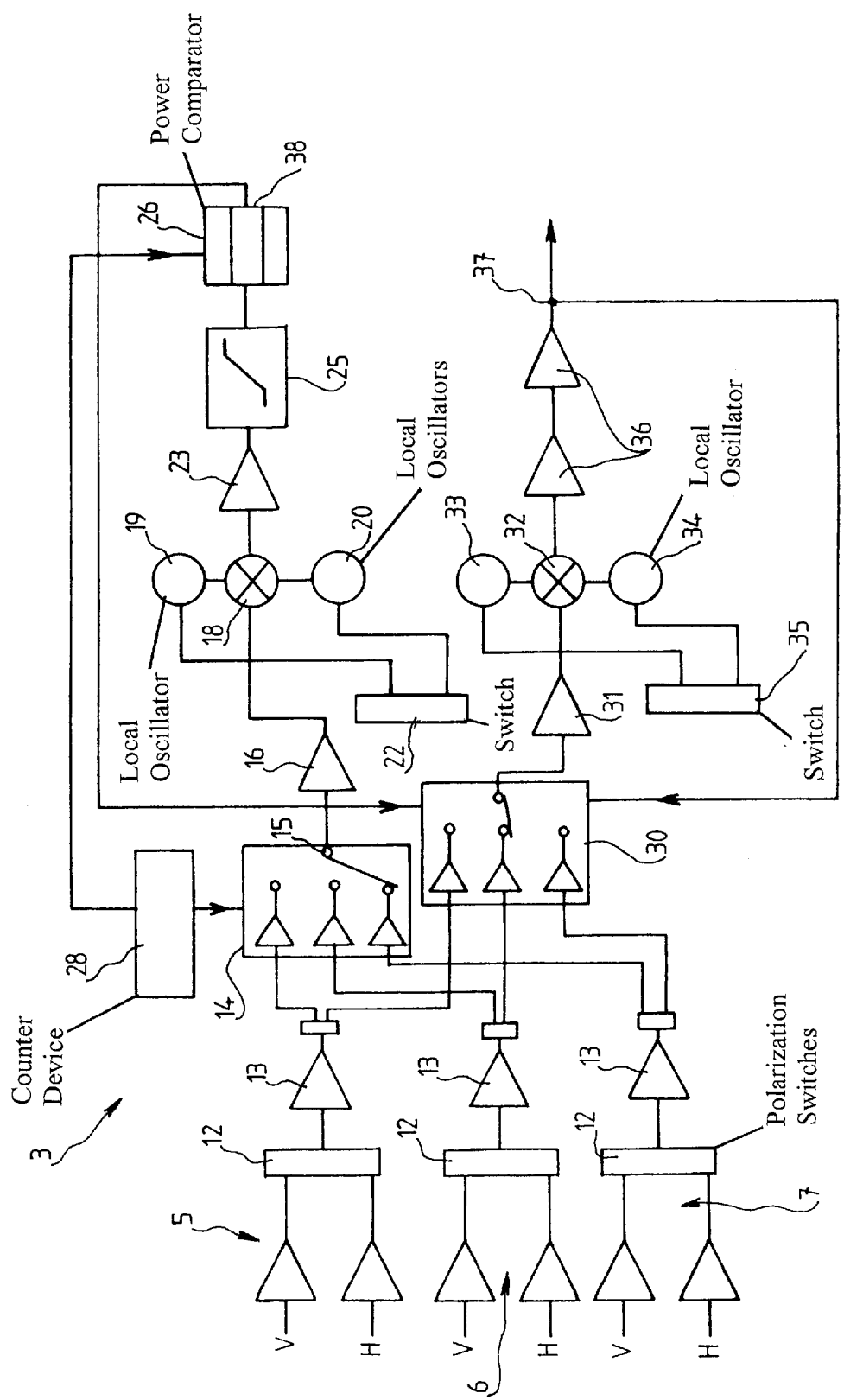
FIG. 4 is a block diagram of the electric structure of FIG. 3.

Referring now to the drawings, FIGS. 1 and 2 show that the antenna system 1 according to the invention comprises a reflector 2 having an elliptic shape the main axis of which lies in a plane that is parallel to the geostationary orbital path, as seen at the receiving place, and a multi-source device 3 of the monobloc type, which is maintained by a support arm 4.

In the example shown in the drawings, the multi-source device 3 comprises three identical individual sources 5, 6, 7 that are arranged at a certain distance the one from the other in a vertical plane which comprises the focal point of the antenna reflector 2 in order to create a number of corresponding main beams which are shifted in the vertical plane while being widely overlapped. The number of individual sources and the distance therebetween are dependent on the aperture height of the antenna and on the extent of the tracking zone to be made by the antenna. Actually, in some cases, it could be advantageous, or even compulsory, for geometrical reasons, not to use sources of the conventional horn type, but other radiating elements such as printed grid type elements or similar elements that are known in the micro-wave art. Actually, the purpose of using and arranging a plurality of individual sources is to permit the antenna to have a good quality of reception of the signals that are transmitted by the satellite, even if this satellite begins to deviate from its initial position.

In the example shown in the drawings, the multi-source device 3 which is made in the shape of a monobloc device comprises the above mentioned three individual sources 5, 6, 7 which could be protected by means of a common protective hood 9 as shown in FIG. 3. FIG. 3 also shows that the three individual sources 5, 6, 7, while they are arranged in the above mentioned vertical plane that passes through the focal point of the reflector 2, have a suitable angular shift which is a function of the tracking extent. The multi-source device 3 comprises an electronic source selecting device 11 the function of which will be hereinbelow revealed. The selecting device 11 of the multi-source device 3 is connected to a device for treating the signals that are received by the multi-source device 3 and which is not shown.

The structure of the selecting device 11 will now be described by reference to FIG. 4.

As shown in the block diagram of FIG. 4, each individual source 5, 6, 7 is of a type used in the LNB (Low Noise Block) converters and is adapted to receive linear polarization signals, i.e. horizontal and vertical polarization signals, as this is diagrammatized by letters V and H, respectively. Each individual source 5, 6, 7 comprises, in a known per se manner, a polarization switch 12 able to be operated by the user, also in a known per se manner. Thus, each switch 12 comprises two inputs each one corresponding to one of the two polarization modes V and H of the received signal.

The output of the switch 12 is connected to a pre-amplifier 13. The output of each pre-amplifier 13 is connected to one input of a three position switch 14 the output 15 of which is connected, by means of an amplifier 16, to a mixer 18 to which are operatively associated two local oscillators 19, 20 able to be selectively connected to the mixer 18 by means of a frequency band switch 22 thereby enabling the antenna to work either in a high frequency band or in a low frequency band. Actually, the satellite will transmitt on a high frequency band ranging from 11.7 GHz to 12.75 GHz, and on a low frequency band ranging from 10.70 GHz to 11.70 GHz. The local oscillators 19, 20 will produce signals of 10.6 GHz and 9.75 GHz, respectively. The mixer 18 is connected, by means of an amplifier 23, to a power detector 25 the output of which is connected to a power comparator 26. The multiplexer switch 15 is controlled by a counter device 28 which also controls the comparator 26.

According to FIG. 4, the output of each amplifier 13, and therefore, by means of the amplifier 13, the output of each polarization switch 12, is still connected to one input of an individual source selector 30 also made in the shape of a switch the output of which is connected, by means of an amplifier 31, to a mixer 32 connected with two local oscillators 33, 34, respectively, able to be selectively connected to the mixer by means of a band switch 35. The local oscillators 33, 34 will produce signals of 10.6 GHz and 9.75 GHz, respectively, similary as the oscillators 19 and 20 and could be identical to them for enabling the antenna to work in one of the two high or low frequency bands. The output of the mixer 32 is connected, by means of amplifier stages 36, to the output 37 of the antenna which is connected to one or a plurality of signal treating devices which are not shown.

As this is also seen in FIG. 4, the output 37 of the antenna 1 and the output 38 of the comparator 26 are connected to the source selector switch 30 to control the source selector switch 30.

The antenna with its multi-source device 3 and the electronic selecting device 11 will work on the following way:

Signals issued from the satellite are received by each individual source 5, 6, 7 by means of the reflector 2. The polarization switches 12 are suitably switched according to whether the received signals have an horizontal or a vertical polarization. The switch 14 periodically and successively interrogates the outputs of the three polarization switches 12 under control of the counter 28. Consequently, the switch 14 successively transmits the output signals of each individual source 5, 6, 7, by means of a common mixer 18, to the power detector 25. The comparator 26 makes a comparision of the signal that is detected in the momentaneous position of the switch 14 with the signals which were priorly detected and are representative of the output signals of the two other individual sources, which have been stored in the comparator 26. The comparator 26 will then addresses a control signal to the selection switch 30 in order the selection switch 30 to be always switched onto that individual source the output signal of which is the greatest among the signals which are produced by the three sources that are successively interrogated by the switch 14. When radiating elements of the grid type are used, a soft switching and/or a phase combination of the individual radiating elements could be considered for creating suitable illumination functions proving the deviation of the desired reception beams.

For facilitating the initial positionning of the antenna system, the number of the individual sources is an uneven number, for example in the number of three as shown in the drawings, and the selection switch 30 will be switched as a function of the signal taken at the output 37 on the good source as a function of the position of the satellite at the moment of installing the antenna. The tracking extent is optimized with respect to the North-South movement of the satellite. Then, locking of the selection switch 30 on the selected source is removed, and the system will work in an automatic manner by cyclically interrogating the various sources.

It should be noted that the reflector 2 has the hereinabove elliptic shape with its main axis that is aligned with the geostationary orbital path since, under these conditions, the individual beams are broader in the vertical plane than in the horizontal plane, which permits to minimize the number of individual sources for a predetermined desired gain.

Those skilled in the art will, of course, appreciate the many advantages of the present invention and will also recognize that many modifications can be made without departing from the concept and spirit of the invention. It is therefore intended that the equivalent arrangements are to be taken as part of the invention, except as expressively excluded from the wording of the following claims.

What is claimed is:

1. An antenna system for receiving signals that are transmitted by a geostationary satellite, said system comprising a reflector which can be motionless and which has a focal point, a source device associated with said reflector to receive the transmitted signals, and a device for treating the signals received by the source device, wherein said source device comprises means (3, 11) for automatically tracking the satellite that deviates from its initial position to an inclined orbital path while said reflector remains motionless, and wherein said tracking means comprise a plurality of individual sources (5, 6, 7) arranged at a predetermined distance from one another in a vertical plane that contains the reflector focal point, in order to create a multiplicity of overlapping main beams, each individual source producing an output signal, and said tracking means further comprises means for connecting only that one of said individual sources that produces the greatest output signal among the output signals produced by all of said individual sources to the device for treating the signals received by the antenna.

2. The system as set forth in claim 1 wherein said means for automatically tracking the satellite have a predetermined extent, said antenna reflector has an aperture height, and the number of said individual sources and the distance therebetween are dependent on said aperture height of the antenna reflector and on the desired track extent.

3. The system as set forth in claim 2, wherein the source device (3) comprises an even number of individual sources.

4. The system as set forth in claim 1, wherein the source device (3) comprises means (14, 25, 26) for detecting the source that produces the greatest output signal and means (30) for connecting this source to the device for treating the signals received by the antenna.

5. The system as set forth in claim 4, wherein the detecting means comprise a switch (14) for cyclically interrogating said individual sources, a power detector (25) of output signals produced by the sources, and a comparator (26) of said output signals.

6. System as set forth in claim 5, wherein said connecting means (30) comprise a switch for connecting the source that produces the greatest signal to the device for treating the signals received by the antenna, this switch being controlled by said power comparator (26).

7. System as set forth in claim 4, further comprising means for initially positionning the antenna with respect to the satellite, said positioning means being adapted for ensuring a locking of said connecting device (30) on a predetermined individual source.

* * * * *